US006856284B1

(12) United States Patent
Cangiani (10) Patent No.: US 6,856,284 B1
(45) Date of Patent: Feb. 15, 2005

(54) METHODS AND APPARATUS FOR MULTI-BEAM, MULTI-SIGNAL TRANSMISSION FOR ACTIVE PHASED ARRAY ANTENNA

(75) Inventor: Gene L. Cangiani, Parsippany, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/689,626

(22) Filed: Oct. 22, 2003

(51) Int. Cl.[7] .............................................. H01Q 3/24
(52) U.S. Cl. ..................... 342/372; 342/154; 342/373
(58) Field of Search ...................... 342/81, 154, 368, 342/372, 373

(56) References Cited

U.S. PATENT DOCUMENTS

| | | | | |
|---|---|---|---|---|
| 3,872,477 A | * | 3/1975 | King ........................... 342/433 |
| 2002/0175859 A1 | * | 11/2002 | Newburg et al. ........... 342/375 |
| 2003/0095068 A1 | * | 5/2003 | Purdy et al. ................ 342/377 |

* cited by examiner

*Primary Examiner*—Dao Phan
(74) *Attorney, Agent, or Firm*—Edell, Shapiro & Finnan, LLC (57) ABSTRACT

A method and apparatus for simultaneously transmitting, at a common frequency, a plurality of signals on a plurality of beams from a phased array antenna involves forming composite signals that contain the plurality of signals. The composite signals correspond to respective antenna elements in the antenna array and include at least a first signal for transmission via a first transmit beam and a second signal for transmission via a second transmit beam. The phases of the composite signals are a function of signal modulations of the first and second signals and phases of the respective antenna elements required to form the first and second transmit beams. By digitally forming the composite signals, taking into account the modulation phase and beam-forming phase of each signal at each antenna element, hardware requirements are reduced and efficient, saturated amplifier can be employed.

32 Claims, 4 Drawing Sheets

METHODS AND APPARATUS FOR MULTI-BEAM, MULTI-SIGNAL TRANSMISSION FOR ACTIVE PHASED ARRAY ANTENNA

BACKGROUND OF THE INVENTION

1. Field of the Invention

The present invention relates to methods and apparatus for generating multi-beam, multi-signal transmissions using an active phased array antenna.

2. Description of the Related Art

There are many communications, radar, and navigation applications that require multiple transmit beams from a common site, with different signals on the various beams. For example, the next generation of Global Positioning System (GPS) satellites will require the transmission of spot beams to direct higher power military signals to theaters of operation, along with broader earth coverage beams for conventional navigational users. Proposed solutions include the use of a separate gimbaled antenna to provide the spot beam, in addition to the existing earth coverage antenna. Alternative approaches using an active phased array antenna with an electronically steered beam to implement the spot beam have also been proposed.

The use of a separate antenna (mechanically steered or electronically steered) for each beam also requires the use of a separate transmitter and associated electronics to drive each antenna. This greatly increases system cost, size, weight and power requirements over what would be required for a single phased array antenna and transmitter. For example, separate High Power Amplifiers (HPAs) would be required to drive each antenna. Also, the use of separate antennas and separate transmitters for the various beams (e.g., earth coverage and spot beams) limits the ability to re-allocate power among the various beams. This flexibility would provide significant benefit for many applications. For example, the ability to re-allocate power among beams would provide more power to support additional missions with the earth coverage beam when the spot beams are not in use—a very desirable feature for future versions of GPS.

Note that active phased array antennas have been configured to provide multiple simultaneous beams with the same signal on all of the beams. However, a phased array configuration with different signals on each of the beams has not previously been implemented. Preferably, a system capable of producing multiple beams for multiple signals would permit the use of composite signals whose amplitude envelopes are constant. If non-constant envelope signals are applied to the HPAs, the use of highly efficient, saturated HPAs is precluded. Linear methods that generate non-constant-envelope composite signals result in power-inefficient mechanizations, because the power amplifiers that are used for transmission of the composite signals must operate in the linear region. Power amplifiers are much more efficient when operated in the saturated mode. For example, linear superposition of chip-synchronous, orthogonal signals to be transmitted is a theoretically lossless multiplex if the subsequent transmission chain remains linear. Maintaining linearity requires a linear high power amplifier (HPA). Since any HPA characteristic eventually saturates as its input power increases, such base station transceiver linear amplifiers are typically run at 4–5 dB average power backoff to accommodate peak power needs.

Thus, linear combination techniques are maximally efficient in the sense that there is no actual signal power loss, but the overall efficiency of such techniques is compromised by the need to operate the amplifier at a significant power back-off to accommodate the instantaneous signal envelope fluctuations. An alternative approach to producing greater average power is to achieve a more effective allocation of the loss budget between the multiplexer and the high power amplifier. Non-linear multiplex methods that produce a constant-envelope composite signal permit a greater fraction of the available transmitter power to be used for communication, but at the expense of a multiplexing loss that may be characterized as an intermodulation product. This multiplexing loss, however, is typically smaller than the power backoff it replaces, resulting in a favorable trade. Therefore, constant-envelope signal structures are required if full-power, undistorted transmission is sought. Consequently, in developing a scheme to simultaneously transmit multiple beams with multiple signals, it would be desirable to transmit from each antenna element in the array a constant amplitude envelope composite signal to permit the use of power-efficient, saturated HPAs.

SUMMARY OF THE INVENTION

Therefore, in light of the above, and for other reasons that become apparent when the invention is fully described, an object of the present invention is to simultaneously transmit a plurality of different signals on a plurality of different beams at the same carrier frequency from a common antenna.

A further object of the present invention is to reduce the overall hardware for a system required to transmit multiple different signals on multiple different beams from a common site or location, thereby reducing system cost, weight, size and power.

Yet a further object of the present invention is to dynamically allocate power among a plurality of beams being simultaneously transmitted by a common antenna.

Another object of the present invention is to efficiently generate constant-envelope signals to allow use of saturated high power amplifiers in signal transmission.

The aforesaid objects are achieved individually and in combination, and it is not intended that the present invention be construed as requiring two or more of the objects to be combined unless expressly required by the claims attached hereto.

In accordance with the present invention, a plurality of signals can be simultaneously transmitted on a plurality of beams from a phased array antenna at a common frequency. The technique involves forming composite signals that correspond to respective antenna elements in the antenna array. The phases of the composite signals are a function of signal modulations of the component signals and phases of the respective antenna elements required to form the corresponding beams. By digitally forming the composite signals, taking into account the modulation phase and beam-forming phase of each signal at each antenna element, multiple individually steerable beams, each with it's own unique signal, can be generated.

More specifically, for example, a method of transmitting two signals from a common antenna includes: generating a first signal for transmission via a first transmit beam; generating a second signal for transmission via a second transmit beam; forming a composite signal that includes the first and second signals, wherein the phase of the composite signal accounts for signal modulation and beam forming characteristics of the first and second signals; and transmitting the composite signal from the common antenna, thereby transmitting the first signal via the first transmit beam and transmitting the second signal via the second transmit beam. For example, the first transmit beam can be a GPS earth coverage beam and the second transmit beam can be a steerable GPS spot beam. This can be easily extended to include additional beams with additional signals.

The common antenna can be a phased array antenna comprising an array of antenna elements, where a plurality of composite signals corresponding to respective antenna elements are formed, with the phases of the composite signals being a function of the signal modulation and the phases of respective antenna elements required to form the plurality of transmit beams.

In accordance with one embodiment, a plurality of first modulated signals are phase shifted in accordance with phases of the respective antenna elements required to form the first transmit beam, and a plurality of second modulated signals are separately phase shifted in accordance with phases of the respective antenna elements required to form the second transmit beam. The two sets of phase shifted signals are then combined to form the plurality of composite signals. The first and second modulated signals can be separately attenuated to control the distribution of power between the first and second transmit beams.

In accordance another embodiment, a plurality of digital composite signals corresponding to the respective antenna elements are formed, wherein phases of the digital composite signals are a function of modulation of the first and second signals and phases of the respective antenna elements required to form the first and second transmit beams. The digital composite signals are converted to analog composite signals and carrier signals are modulated with the analog composite signals to form the plurality of composite signals. Phases of a plurality of first digital signals corresponding to the respective antenna elements are determined based on a modulation of the first signal and phases of the respective antenna elements required to form the first transmit beam. Similarly, phases of a plurality of second digital signals corresponding to the respective antenna elements are determined based on a modulation of the second signal and phases of the respective antenna elements required to form the second transmit beam. The plurality of digital composite signals are then formed based on the phases and amplitudes of the plurality of first and second digital signals.

With this embodiment, according to one approach, the digital composite signals are computed from a vector sum of the first and second digital signals. More specifically, for each antenna element, a composite phase is determined based on the phase and amplitude of the component signals, where the phase of each component signal is, in turn, determined from the instantaneous modulation phase and beam forming phase of the component signal for each antenna element. Advantageously, the composite signal can have a constant envelope, which permits the use of efficient, saturated high power amplifiers.

According to another approach, the digital composite signals are formed by interleaving the first and second digital signals in a time division manner. This approach avoids signal clipping that may occur with summing the signals. Distribution of power between the beams can be controlled by selecting the ratio of the time segments allocated to each of the signals in the interleave pattern.

An apparatus for transmitting a plurality of signals in accordance with the invention includes the aforementioned phased array antenna and a transmitter system. The transmitter system receives a first signal for transmission via a first transmit beam and a second signal for transmission via a second transmit beam and possibly additional signals for transmission via additional transmit beams, and forms a plurality of composite signals for respective antenna elements of the phased array antenna, wherein phases of the composite signals are a function of signal modulations of the multiple signals and phases of the respective antenna elements required to form the multiple transmit beams.

The following descriptions of various embodiments assume that only two signals are to be transmitted via two transmit beams, for simplicity. Note that the invention is not limited to two signals via two beams. It can be utilized to transmit several independent signals, each via its own dedicated, independently steerable beam.

According to the embodiment in which the first and second signals are separately modulated and phase shifted, the transmitter system includes a first power splitter that produces a plurality of first modulated signals from the first signal; a first array of phase shifters that phase shift the first modulated signals in accordance with phases of the respective antenna elements required to form the first transmit beam; a second power splitter that produces a plurality of second modulated signals from the second signal; a second array of phase shifters that phase shift the second modulated signals in accordance with phases of the respective antenna elements required to form the second transmit beam; and a combiner that combines the phase shifted first modulated signals with respective phase shifted second modulated signals to form the plurality of composite signals. A first array of attenuators can be used to attenuate the first modulated signals and a second array of attenuators can be used to attenuate the second modulated signals to control a distribution of power between the first and second transmit beams. Since the composite signal does not have a constant envelope in the embodiment, the transmitter system requires an array of linear amplifiers that respectively amplify the plurality of composite signals.

In accordance with the digital implementation, the transmitter system includes a processor that forms a plurality of digital composite signals corresponding to the respective antenna elements, wherein phases of the digital composite signals are a function of modulation of the first and second signals and phases of the respective antenna elements required to form the first and second transmit beams. An array of digital-to-analog converters convert the digital composite signals to analog composite signals, and an array of signal modulators modulate carrier signals with the analog composite signals to form the plurality of composite signals.

The processor determines phases of a plurality of first digital signals corresponding to the respective antenna elements based on a modulation of the first signal and phases of the respective antenna elements required to form the first transmit beam, and determines phases of a plurality of second digital signals corresponding to the respective antenna elements based on a modulation of the second signal and phases of the respective antenna elements required to form the second transmit beam. The processor then forms the plurality of digital composite signals based on the phases and amplitudes of the plurality of first and second digital signals. This can be accomplished using the aforementioned summing approach or the interleaving approach.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

The system described herein provides a unique method for simultaneously transmitting multiple beams, each with its own signal component, from the same active phased array antenna. This configuration eliminates the need for separate antennas and transmitters for each of the required beams. The system is capable of forming multiple simultaneous beams, for example an earth coverage beam and multiple spot beams covering multiple theaters of operation, with the capability to re-allocate power among the various beams, which, in the context of satellite systems, can be performed on-orbit. The composite signal applied to each high-power amplifier (HPA) preferably, although not necessarily, has a constant amplitude envelope, which permits the use of saturated HPAs with their attendant power efficiency.

As used herein, the terms antenna beam(s), transmit beam(s) or simply "beam(s)", including spot beams and earth-coverage beams, refer generally to radiated energy concentrated in a certain direction. The radiated antenna beam is formed by a directional antenna and radiates over a particular angular region in accordance with the antenna pattern (i.e., the radiated field intensity as a function of angle), resulting in transmission of a directed signal. The antenna beam may be fixed in a particular direction or may be electronically or mechanically steered over a range of directions. In the case of an antenna comprising an array of antenna elements that individually transmit signals in a coordinated manner, it is possible to electronically steer the antenna beam by controlling the relative phases of the signals transmitted by the antenna elements.

The term "multi-beam, multi-signal" refers to the simultaneous transmission of two or more different beams (e.g., having different directions and/or shapes) from a common antenna at the same carrier frequency, wherein two or more different signals (e.g., containing different information, having different timing, signal structure, coding, etc.) are being transmitted via the beams, and at least one of the beams carries a signal that is different from a signal carried by at least one other of the beams. The simplest example is a two-beam configuration (e.g., a GPS spot beam and earth coverage beam) in which one of the beams carries a first signal and the other beam carries a second, different signal, wherein both signals are transmitted at the same frequency (e.g., the GPS L1 frequency). The term "multi-beam, multi-signal" does not preclude more complex arrangements (e.g., three or more beams wherein each beam can carry its own unique signal or the same signal that is carried on one or more of the other beams.)

Figure 1:
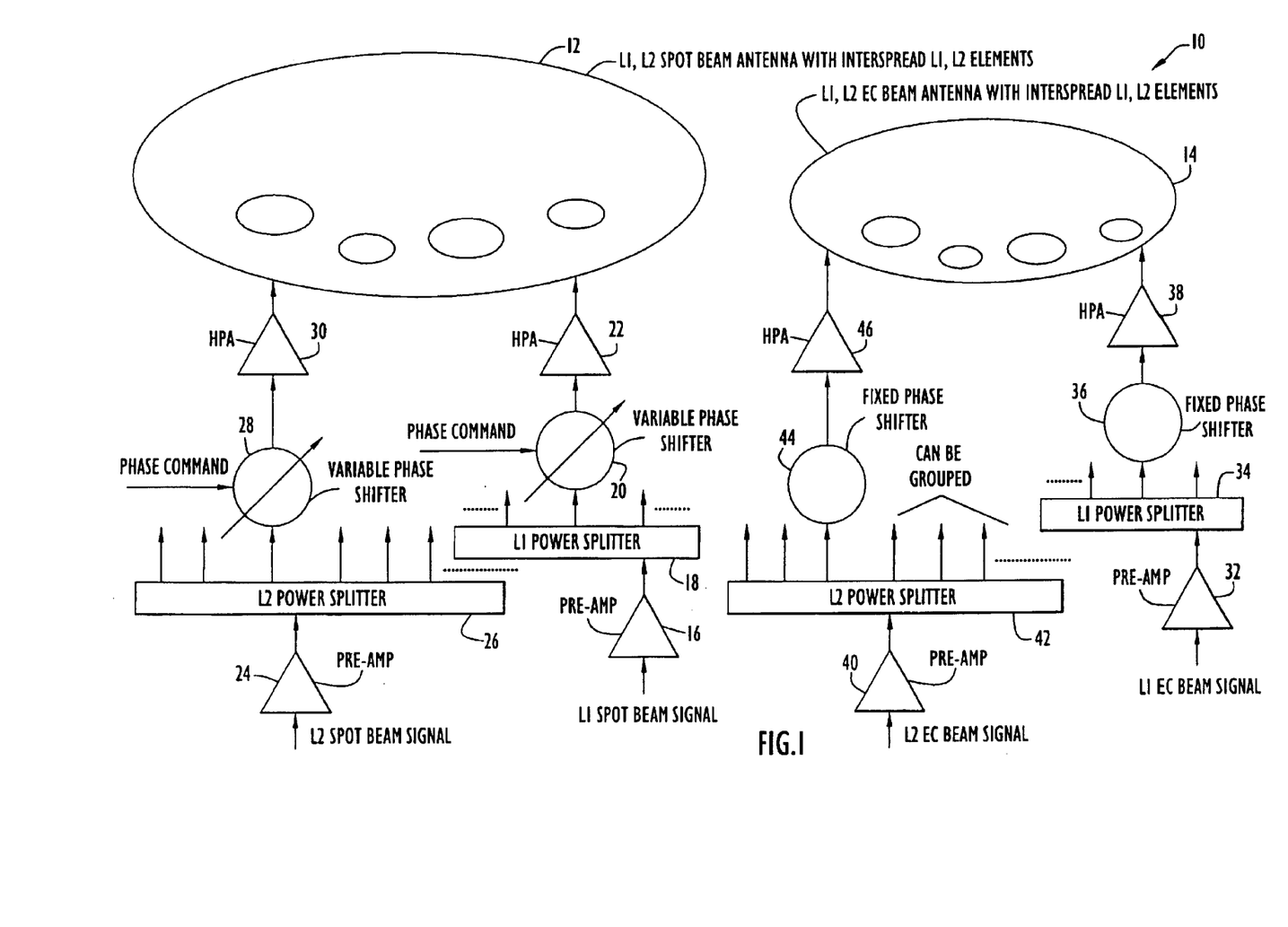
FIG. 1 is a functional block diagram illustrating a typical two-antenna approach to generating plural beams for transmitting plural signals.

To better appreciate the invention, a more typical two-antenna configuration for generating two separate beams with separate signals is first described. Referring to FIG. 1, a GPS satellite transmitter system 10 employing two separate antennas is shown. The GPS satellite is required to transmit signals at the GPS L-band frequencies (L1 at 1575.42 MHz and L2 at 1227.6 MHz) via both narrow beamwidth spot beams (e.g., for potential military applications) and wider beamwidth earth-coverage beams (e.g., for civilian and commercial use). To meet these requirements, system 10 includes a first, spot-beam antenna 12 and a second, earth-coverage-beam antenna 14. Antennas 12 and 14, represented in FIG. 1 by ovals, can be phased-array antennas comprising arrays of antenna elements (the multi-element nature of the antennas is suggested by the smaller ovals depicted within the larger antenna ovals). Because beamwidth is inversely proportional to antenna size, spot-beam antenna 12 is physically larger than earth-coverage antenna 14, as suggested by the relative oval sizes in FIG. 1. The size of the antennas is determined by the smallest spot or footprint required. The smaller, earth-coverage-beam antenna 14, for example, can be approximately three feet in diameter if beam shaping is required, or can be somewhat smaller with no beam shaping. To enable transmission at both the L1 and L2 frequencies, both antennas 12 and 14 include antenna elements that transmit at the L1 frequency interspersed with antenna elements that transmit at the L2 frequency. This configuration is really four antennas occupying the physical space of two antennas, via interleaving of the elements.

Referring to the spot beam transmitter system shown on the left side of FIG. 1, a spot beam signal at the L1 frequency is amplified by a preamplifier 16 and supplied to a power splitter 18 that distributes the L1 spot beam signal to an array of variable phase shifters 20 corresponding to respective L1 antenna elements in the spot beam antenna array. Each of the variable phase shifters 20 imparts a phase shift on the input L1 spot-beam signal in accordance with an individual phase command. The set of phase commands respectively supplied to the array of variable phase shifters 20 causes the spot beam to be electronically steered in a particular direction. By adjusting the relative phases of the phase commands, the beam can be steered over a range of angles as needed to support particular GPS functions or operations employing spot beams. An array of high-power amplifiers (HPAs) 22 corresponding to respective L1 antenna elements in the antenna array amplifies the phase-shifted L1 spot beam signals from the variable phase shifters 20 prior to transmission of the signals by the respective L1 antenna elements.

Similarly, a spot beam signal at the L2 frequency is amplified by a preamplifier 24 and supplied to a power splitter 26 that distributes the L2 spot beam signal to an array of variable phase shifters 28 that correspond to respective L2 antenna elements in the antenna array and effect beam steering of the L2 spot beam. Each of the L2 spot beam signals is amplified by a corresponding HPA 30 (one HPA for each L2 antenna element) and transmitted via a corresponding L2 antenna element, such that the array of phase-shifted L2 spot beam signals forms the electronically steered L2 spot beam.

In the system shown in FIG. 1, the L1 and L2 earth-coverage beams are generated using a separate earth coverage antenna requiring additional hardware to generate the L1 and L2 earth coverage beams. Specifically, referring to the earth-coverage beam transmitter system shown on the right side of FIG. 1, an earth coverage beam signal at the L1 frequency is amplified by a preamplifier 32 and supplied to a power splitter 34 that distributes the L1 spot beam signal to an array of fixed phase shifters 36. Because the earth coverage beam is not electronically steered, fixed phase shifters can be used. Due to symmetry, certain L1 antenna elements will have the same phase shift, allowing sets of elements with the same fixed phase shift to be grouped. Consequently, a single fixed phase shifter and HPA can be used to drive a set of antenna elements having the same phase shift. After amplification by the HPAs 38, the L1 earth coverage beam signals are transmitted via the L1 earth coverage antenna elements to form the earth coverage beam.

Similarly, an earth coverage beam signal at the L2 frequency is amplified by a preamplifier 40 and supplied to a power splitter 42 that distributes the L2 earth coverage beam signal to an array of phase shifters 44. Each of the phase-shifted signals is amplified by a corresponding HPA 46 prior to transmission. As with the L1 earth coverage beam, because sets of L2 earth coverage beam antenna elements have the same phase shift, certain elements can be grouped and driven by a single fixed phase shifter and HPA, such that the number of fixed phase shifters and HPAs may be less than the number of L2 antenna elements. As will be appreciated from the configuration shown in FIG. 1, two separate antennas are required to generate the spot beam and the earth coverage beam, and each of these antennas requires the complete transmitter hardware for generating signals at the L1 and L2 frequencies (i.e., two antennas and four sets of transmitter hardware). These hardware requirements make this configuration costly. Moreover, there is no possibility of dynamically allocating power between the spot beam and earth-coverage beam to adapt to varying operational requirements or conditions.

The signal combining techniques of the present invention permit multiple, different antenna beams carrying multiple, different signals to be simultaneously transmitted using a single set of transmitter hardware and a single antenna. More specifically, the combining technique operates on a particular RF carrier to simultaneously transmit via a common antenna (e.g., a phased-array antenna) at least first and second signals at the same frequency, wherein the first signal is transmitted via a first antenna beam, and the second signal is transmitted via a second antenna beam that can, in general, be different from the first antenna beam in direction, beamwidth, power, antenna gain pattern, etc.

Most signals of interest for communication and navigation applications are different phase modulations of the same RF carrier, and beam-forming is accomplished by imparting additional phase shifts to the signals that are applied to each of the antenna elements. An important concept underlying the present invention is to combine phase modulation and beam-forming to derive a composite phase for application to each array element. At any instant of time, the signal phase will vary from one array element to another in order to effect the configuration of beams, while, at any one array element the signal phase varies in time due to the phase modulation on the various signals. A variety of methods can be used to combine the various signal components to achieve the desired composite signal, and the optimal combining technique is dependent on the specific application. Some example techniques are described herein.

Figure 2:
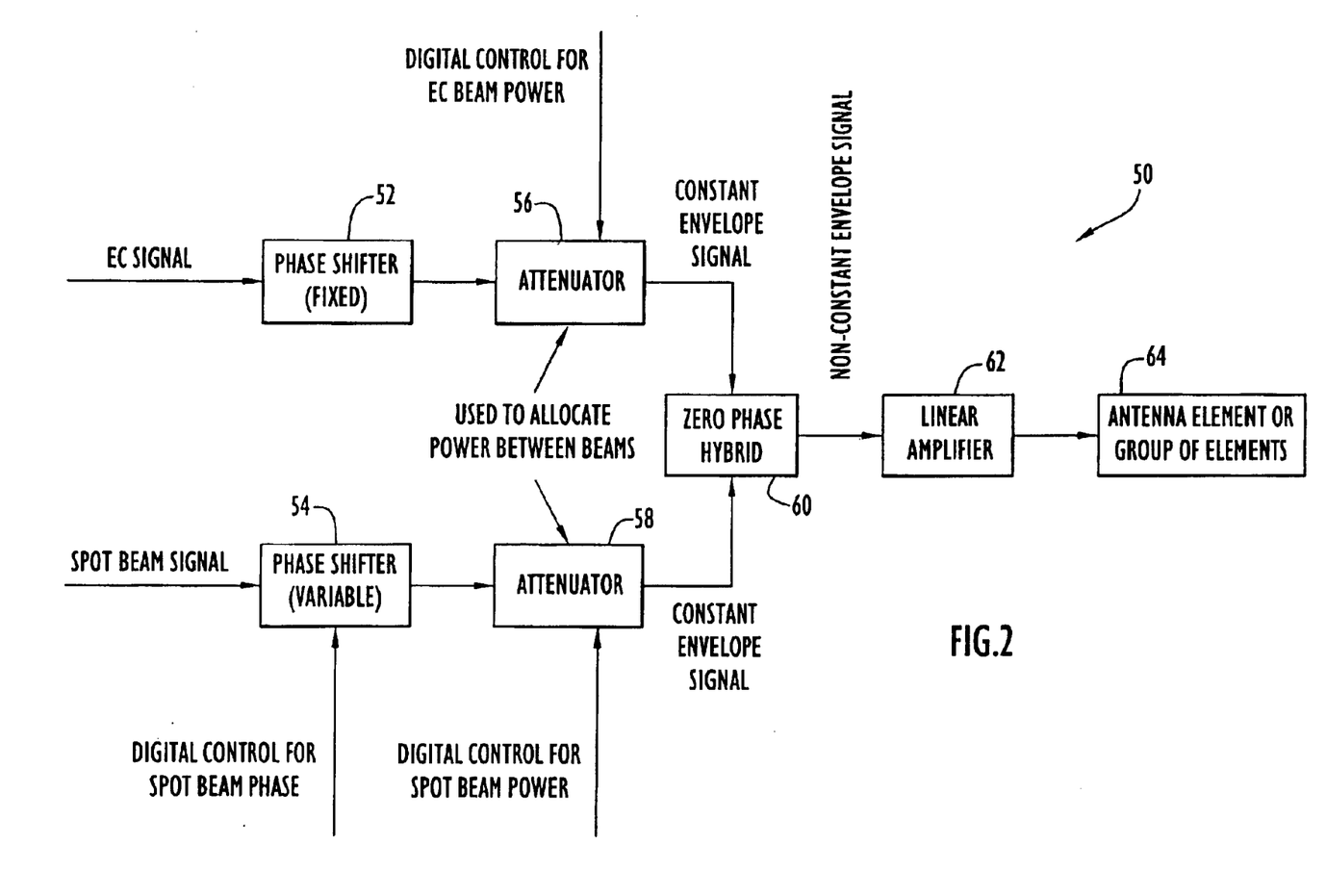
FIG. 2 is a functional block diagram illustrating a transmitter system for simultaneously transmitting plural signals on plural beams from a common antenna in accordance with an exemplary embodiment of the present invention.

The most straight-forward signal combining technique to achieve the desired result of multiple beams with corresponding different signals is to sum the signals corresponding to each beam. FIG. 2 illustrates a signal combining system 50 that implements this approach in the context of a GPS satellite transmitter required to transmit both a spot beam and an earth coverage beam at a particular frequency. The components of the signal combining system 50 shown in FIG. 2 relate to a single antenna element of a phased-array antenna (or a group of antenna elements where certain antenna elements always have the same phase due to symmetry). The overall transmitter system includes a plurality of these components, with one set of components for each antenna element (or group of elements) in the antenna array.

For each antenna element (or group), signal combining system 50 includes a phase shifter 52 that phase shifts the earth coverage signal (designated as the "EC Signal") at a particular frequency and phase shifter 54 that phase shifts the spot beam signal at the same frequency. The input earth coverage signal shown in FIG. 2 is one of an array of such signals generated by splitting an initial earth coverage signal via a power splitter (not shown) after amplification by a pre-amplifier (not shown) and corresponding to the array of antenna elements. The input spot beam signal shown in FIG. 2 is likewise one of an array of such signals generated in a similar manner. If the direction of the earth coverage beam remains constant over time, phase shifter 52 can be a fixed phase shifter. Phase shifter 54 is preferably a digitally controlled variable phase shifter to permit electronic steering of the spot beam.

The phase-shifted earth coverage signal and spot beam signal are respectively attenuated by attenuators 56 and 58, which are used to allocate power between the two beams. The attenuated earth coverage and spot beam signals, which are both constant envelope signals, are supplied to a zero phase hybrid 60, which can be, for example, a standard RF signal combiner such as a Wilkinson Combiner. The resulting composite signal has a non-constant envelope. Consequently, a linear amplifier 62 is used to amplify the composite signal prior to transmission by an antenna element 64 (or group of elements where permitted by symmetry).

This configuration produces a dual beam (earth coverage and spot) with separate signals on each beam, and provides the capability to allocate total power between the two beams by adjusting the attenuators. One disadvantage of this technique is that the composite signal that is supplied to the amplifier is not a constant envelope signal, so the amplifier needs to be a linear amplifier, which is less efficient than a saturated amplifier, as described above. Also, if additional beams with additional signals are appended, additional headroom must be allocated in the linear amplifier to accommodate larger amplitude swings in the composite signal, further degrading power efficiency.

In accordance with another embodiment, power efficiency can generally be improved by adding a third signal component that results in a constant envelope composite signal. At any instant of time, the earth coverage signal and the spot beam signal will have an arbitrary phase shift between them, since the absolute phase of each signal is the sum of the phase from its modulating signal and the phase required to form its desired beam shape. In the context of the GPS example involving a spot beam and earth coverage beam, the beam forming phase angle for the spot beam is generally much slower changing than the phase angle from the signal modulation, and the phase angle for the fixed earth coverage beam is constant for each antenna element.

Figure 3:
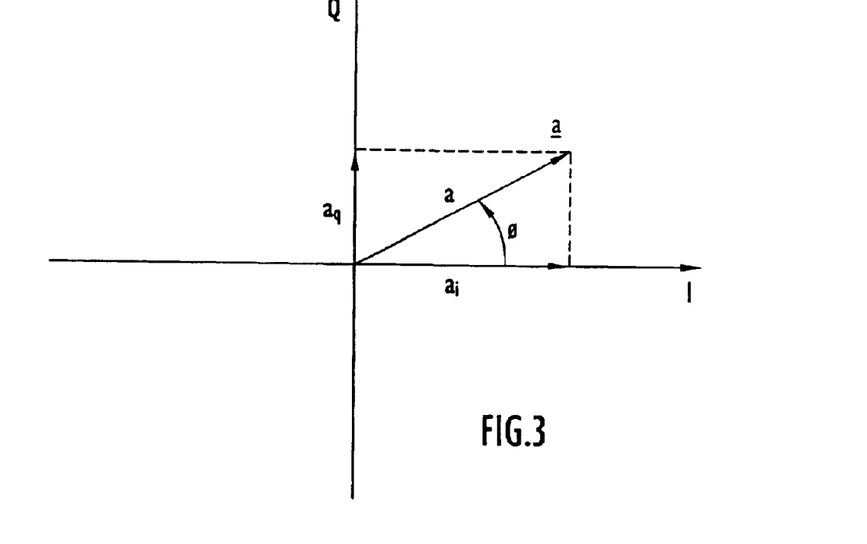
FIG. 3 is a graph illustrating a convention for describing vectors.
Figure 4:
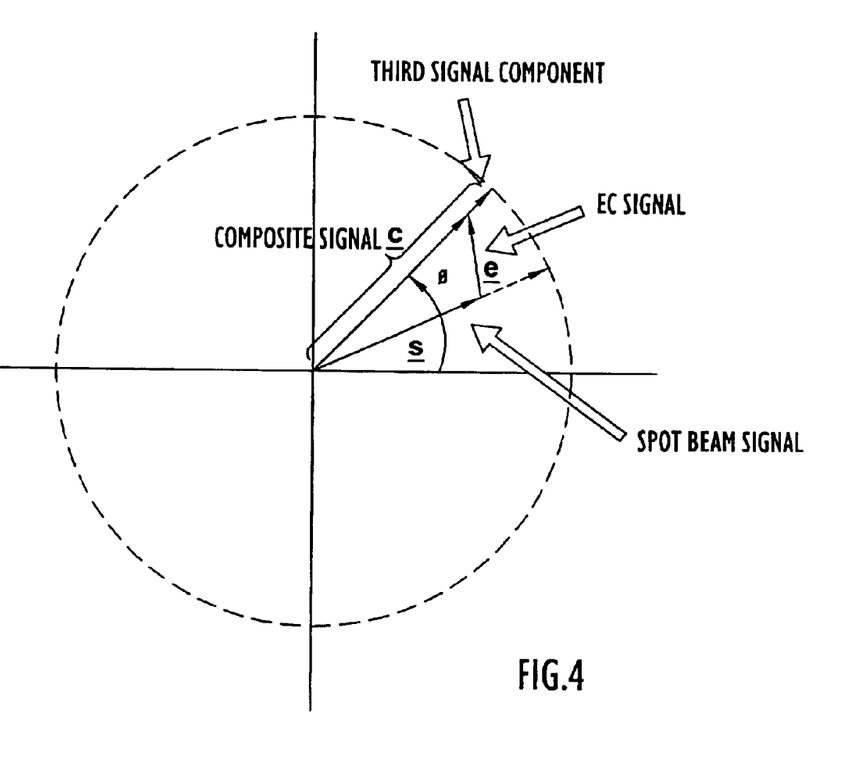
FIG. 4 is a graph illustrating vector addition of signals to generate a constant-envelope composite signal.

Understanding of the concept of generating a constant envelope signal using an additional signal component is facilitated by the vector analysis described in conjunction with FIGS. 3 and 4. Referring to FIG. 3, a vector $\underline{a}$ can be described as consisting of a magnitude, a, and the angle, θ, that it forms with the in-phase axis, I, $\underline{a}=a<\theta$, wherein the character < means "at angle." Then, the magnitudes of the components of $\underline{a}$ along the I and Q axes are: $a_i=a*\cos(\theta)$ and $a_q=a*\sin(\theta)$, respectively.

Referring now to FIG. 4, let the spot beam signal be represented as the vector $\underline{s}=s<\alpha$, and the earth coverage signal as the vector $\underline{e}=e<\beta$. The circle shown in FIG. 4 represents a constant envelope. The circle has a radius equal to the maximum possible amplitude of the sum of the spot beam signal and the earth-coverage-beam signal, which results when the spot beam signal vector and the earth-coverage-beam signal vector are at the same angle (i.e., the scalar sum of the amplitudes of the two beams). If at some instant of time, these vectors are collinear (e.g., the dashed orientation for $\underline{e}$ shown in FIG. 4), the composite signal magnitude, c, would be e+s, or the radius of the circle. Consequently, once the individual levels of the spot-beam signal and earth-coverage beam signals have been determined, the composite amplitude, c, of the constant envelope signal is set to the sum of those two signal levels, or c=e+s.

At any arbitrary instant of time, the composite signal can be derived as follows:

$$m_i=s*\cos(\alpha)+e*\cos(\beta) \quad (1)$$

$$m_q=s*\sin(\alpha)+e*\sin(\beta) \quad (2)$$

Then the angle, θ, of the composite signal can be determined:

$$\theta=\tan^{-1}(m_q/m_i) \quad (3)$$

The in-phase (I) and quadrature (Q) channel inputs can then be computed as:

$$I=c*\cos(\theta) \quad (4)$$

$$Q=c*\sin(\theta) \quad (5)$$

As shown in FIG. 4, when the two vectors are not at same angle, the amplitude of the resultant vector $\underline{e}+\underline{s}$ is less than the radius of the circle. By adding a third signal component at angle θ, the magnitude of resultant vector can be extended out to the constant envelope circle. Thus, the desired composite signal can be constructed as the vector at angle θ with its magnitude scaled to the desired magnitude, c=e+s (circle radius). Then, at every instant of time, the computed composite signal will have the same amplitude, allowing the use of highly efficient, saturated amplifiers. The in-phase and quadrature channel inputs can thus be easily calculated for each antenna array element.

The resultant composite signal can be viewed as the vector summation of the spot beam signal vector and the earth coverage signal vector, plus the additional third signal component that serves to re-scale the signal to the appropriate amplitude. The net result of adding this third signal component is the composite signal, $\underline{c}$, which has a constant amplitude (radius of the circle), allowing the use of highly efficient saturated amplifiers. This concept can be easily extended to more than two beams with a unique signal on each beam, while maintaining a constant amplitude (envelope) signal. The power contained in the additional signal component, labeled "Third Signal Component" in FIG. 4, is wasted power. It is the "cost" of obtaining a constant envelope composite signal, similar to the inter-modulation component in an interplex modulator. As with interplex modulation, overall efficiency is significantly improved over the configuration with linear amplifiers. The disadvantage of this technique is that it is equivalent to "clipping" the desired composite signal vector and, depending upon the application, it may not be possible to exercise effective control over the relative power ratios among the various signal components.

Note that it is not necessary to implement three signal channels for each array element in order to achieve this constant envelope condition. The composite signal vector $\underline{c}$ in FIG. 4 can be calculated, and then the in-phase and quadrature components can be calculated as $c*\cos(\theta)$ and $c*\sin(\theta)$, respectively, where the constant magnitude c is equal to the sum of the vector magnitudes e+s. Then these two components can be applied to in-phase and quadrature signal channels at each array element. Specifically, the in-phase (I) channel receives the signal $c*\cos(\theta)$, and the quadrature (Q) channel receives the signal $c*\sin(\theta)$, as noted above. In operation, the angle θ is determined from the two input vectors (without regard to the magnitude of the resultant vector sum), and then the magnitude of the resultant vector is simply set (scaled) to c=e+s. Thus, there is no need to actually "calculate" the value of the third (wasted power) signal component. All that is required to determine the I and Q input signals is the computation of the angle θ from the two signal vectors $\underline{e}$ and $\underline{s}$ from which the signals $c*\cos(\theta)$ and $c*\sin(\theta)$ can then be determined.

This configuration eliminates the need for high speed hardware phase shifters at each array element. Each array element amplifier is supplied an in-phase and quadrature component (two RF carrier components that are in phase quadrature), and the magnitude and sign of these two components are generated in the processor. Note that the processor must be fast enough to perform these calculations for each array element at the modulating signal rate. This is well within modern processor/FPGA capabilities for the GPS signals.

Figure 5:
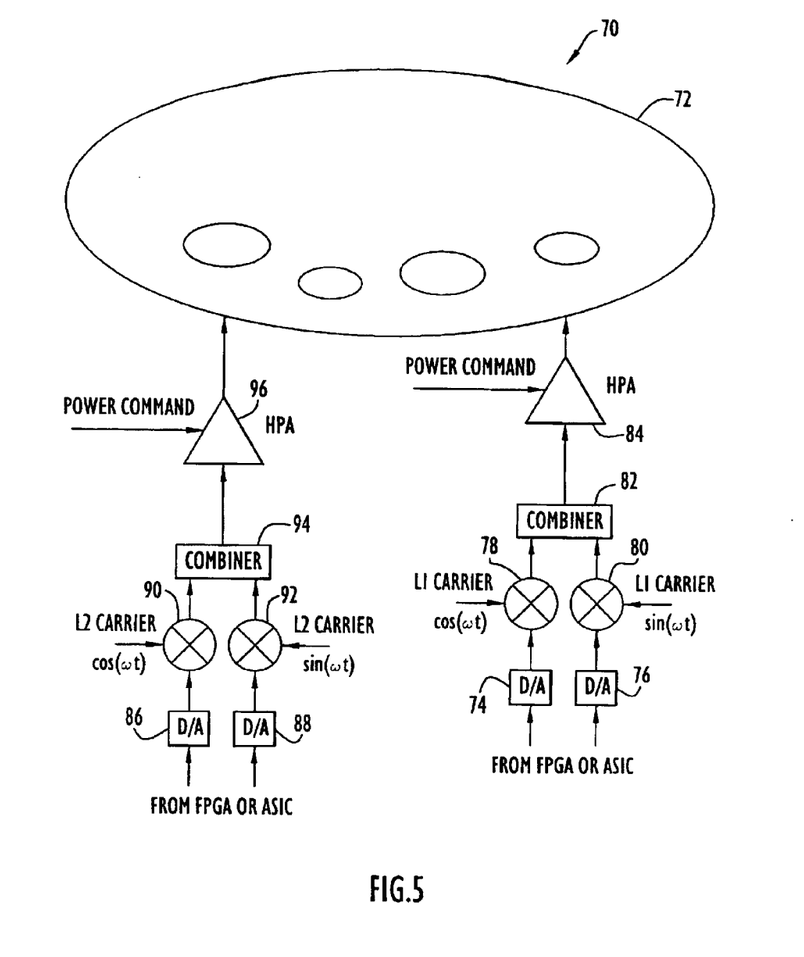
FIG. 5 is a functional block diagram illustrating a transmitter system for simultaneously transmitting plural signals on plural beams from a common antenna in accordance with another embodiment of the present invention.

An implementation of a multi-beam, multi-signal system employing a constant envelope composite signal in the context of a GPS satellite transmitter generating spot beams and earth coverage beams at the L1 and L2 frequency is shown in FIG. 5. In the GPS satellite transmitter system shown in FIG. 5, the satellite is required to transmit signals at both of the GPS frequencies L1 and L2. Consequently, the antenna array includes a first array of antenna elements that radiates at the L1 frequency and a second array of antenna elements interspersed with the first array that radiate at the L2 frequency. While the transmitter components for only a single L1 antenna element and a single L2 are shown in FIG. 5, it will be understood that the system includes arrays of such components respectively corresponding to the arrays of L1 and L2 antenna elements.

At the L1 carrier frequency, a composite in-phase (I) channel digital signal is supplied to digital-to-analog converter 74, while a composite quadrature (Q) channel digital signal is supplied to digital-to-analog converter 76. The input I and Q channel digital signals, which include both the spot beam signal and earth coverage beam signals, are periodically generated by a processor at a rate on the order of the modulating signal rate in accordance with equations (1)–(5) above for each element in the array. Specifically, the composite phase θ is periodically determined from the amplitudes and instantaneous phases of the spot beam and earth coverage beam signals, and digital signals having amplitudes c*cos(θ) and c*sin(θ) are periodically supplied to I and Q D/A converters 74 and 76, respectively. Note that, for each antenna element, the instantaneous phase of the spot beam signal is the sum of the instantaneous modulation phase of the spot beam signal and the phase shift associated with that antenna element required for beam steering. Likewise, for each antenna element, the instantaneous phase of the earth coverage beam signal is the sum of the instantaneous modulation phase of the earth coverage beam signal and the phase shift associated with beam forming for that antenna element. Thus, in general, the input I and Q signals differ from element to element and are determined for each antenna element in the antenna array at the digital signal rate (i.e., at the signal modulation rate).

It will be understood that any of a variety of conventional computing techniques can be used to determine the angle θ and the I and Q input signals, including the use of lookup tables and the like. As shown in FIG. 5, the processor for generating the digital composite signals can be a special purpose processor such as a field programmable gate array (FPGA) or an application specific integrated circuit (ASIC). However, the processor of the transmitter system is not limited to any particular hardware configuration and could be implemented using, for example, a general purpose processor executing a suitable program.

Referring again to FIG. 5, after D/A conversion, the analog I channel signal is supplied to a signal modulator 78 (e.g., a mixer) that modulates the in-phase L1 carrier signal ($\cos(\omega_{L1}t)$) with the I channel signal. Similarly, the analog Q channel signal is supplied to a signal modulator 80 that modulates the quadrature L1 carrier signal ($\sin(\omega_{L1}t)$) with the Q channel signal. The modulated in-phase and quadrature signals are combined by combiner 82 and amplified by high power amplifier 84 prior to transmission of the composite signal by the respective L1 antenna element. While not shown in FIG. 5 for convenience, the transmitter hardware includes an array of similar D/A converters, mixers, combiners and HPAs corresponding to the array of L1 antenna elements.

Similarly, at the L2 carrier frequency, a composite in-phase (I) channel digital signal is supplied to digital-to-analog converter 86, while a composite quadrature (Q) channel digital signal is supplied to digital-to-analog converter 88. The analog I channel signal is supplied to a signal modulator 90 (e.g., a mixer) that modulates the in-phase L2 carrier signal ($\cos(\omega_{L2}t)$) with the I channel signal. Similarly, the analog Q channel signal is supplied to a signal modulator 92 that modulates the quadrature L2 carrier signal ($\sin(\omega_{L2}t)$) with the Q channel signal. The modulated in-phase and quadrature signals are combined by combiner 94 and amplified by high power amplifier 96 prior to transmission of the composite signal by the respective L2 antenna element. While not shown in FIG. 5 for convenience, the transmitter hardware includes an array of similar D/A converters, mixers, combiners and HPAs corresponding to the array of L2 antenna elements.

Importantly, the combined signal supplied to each HPA 84 in the L1 array (and each HPA 96 in the L2 array) is a constant envelope signal that includes both the spot beam signal and the earth coverage beam signal. Consequently, each HPA 84 (and each HPA 96) can be a saturated HPA that transmits a constant envelope signal. The total transmitted power can be adjusted by controlling the saturated power level of each HPA 84 via a power command, which changes the amplifier bias point and allocation of the total power among the various composite signal—beam combinations is effected in the signal combining process. Note that, while each individual antenna element generates a constant envelope signal, the power levels of individual antenna elements may differ from each other, depending on such factors as beam shaping and the number of beam being supported by particular elements. For example, while most or all of the antenna elements in the array would typically be used to generate a steerable spot beam, only a certain number of the antenna elements near the center of the array might be required to generate a stationary earth coverage beam. Consequently, a group of inner antenna elements in the array may be required to generate a composite signal having a higher power level, while the remaining outer elements that support only the spot beam may have lower power levels. While the configuration shown in FIG. 5 employs digital signals and D/A converters to produce the composite phase modulated signals, other hardware can be used to produce the composite signals. For example, phase shifting could be accomplished with phase shifters, as in FIG. 1; however, the phase shifters would be required to change at the signal modulation rate, rather than at the much slower rate at which the phase shifters of FIG. 1 change, which is the rate at which beam pointing changes. This would require very high-speed phase shifters which may be very expensive.

In accordance with yet another embodiment, another technique for combining the various signal components is to utilize a time division multiplexing (TDMA) scheme to time-interleave different beams. For each antenna array element, the composite phase angle for each beam can be calculated, as described above in connection with FIG. 4. However, instead of summing the two vectors, the phase angle that is applied to the array element is alternated between the two angles. The interleaving of the beams can be accomplished by generating digital signals with the appropriate phase at the modulation rate of the signals. Accordingly, this embodiment can be carried out using the same transmitter and antenna hardware shown in FIG. 5.

Equally alternating between the two angles would effect equal power distribution between the two beams, but any desired power ratio can be achieved by generating more of one than the other. For example, selecting the phase angle for beam A twice for every single selection of the phase angle for beam B, would result in a power ratio of $2^2$ (or 4). Equally alternating between A and B, except that at every fifth time instant the angle for A is generated twice in a row, would result in a power ratio of $(6/5)^2$ (or 1.44). With this technique, virtually any power ratio can be effected and the method can easily be extended to more than two beams. There is some combining loss with this technique, and the loss is dependent on the power ratios, but the power efficiency is generally much greater than with linear combining (i.e., the first embodiment described above), and this approach eliminates the disadvantages associated with the "clipping" technique (i.e., the second embodiment described above).

Note that the multi-beam, multi-signal concept is not dependent on the particular signal combining technique that is used. Multiple, independently steered beams, each with its own signal, can be achieved with a single active phased array using any of the signal combining techniques mentioned above, or others. With this technology, additional beams and additional signals can be added (or removed) with no hardware changes, provided sufficient total power is available. In the context of satellite systems, signals and beams can be added on-orbit via software changes and power can be freely allocated among the various beams and signals.

The ability to transmit multiple beams, each with its own unique signal, is an extremely desirable feature for a wide range of diverse applications that require simultaneous transmission of multiple signals, including future generations of GPS, GPS augmentation systems, radar systems, wireless telephony, satellite communication systems, the Global Multi-Mission Service Platform (GMSP), systems employing code division multiple access (CDMA) multiplexing and others communication systems.

The system of the present invention may be implemented using any of a variety of hardware and software configurations and is not limited to any particular configuration. For example, RF signal amplification and/or phase shifting can be performed within an integrated module containing the antenna element, or discrete amplifier, phase shifter and antenna element components can be employed. The size of antenna array not limited to any particular number of radiating antenna elements and can be configured using any appropriate number and arrangement of antenna elements required to meet particular system requirements, such as beamwidth, scan angle, antenna gain, and radiated power. Since beamwidth is a function of antenna size, the smallest spot beam required will be a determining factor in the overall size of the antenna array.

The multi-beam, multi-signal techniques of the present invention can be implemented in a programmable waveform generator of a transmitter system that is remotely reprogrammable. Such an implementation allows remote programmability of transmission and/or reception parameters (e.g., modulation characteristics) of units in the field, such as satellites in orbit, communications infrastructure, and mobile communication devices, including wireless telephones to accommodate system requirements that change over the lifetime of the communication equipment. The capability to reprogram the waveform generator is especially valuable in the space satellite context, where changes in required modulation can take many years and a new satellite design to accomplish. With the reprogrammable waveform generator of the present invention on board, a satellite can be reprogrammed in orbit. In general, the multi-beam, multi-signal techniques can be implemented using any suitable combination of hardware and software.

Depending on beamwidth, antenna gain and power requirements, it may not be necessary to use every antenna element in the array to form every beam. For example, all antenna elements of the array may be used to form a spot beam, while only a subset of those elements may be needed to form an earth coverage beam. In this case, certain antenna elements (inner elements) are transmitting composite signals containing two signals (i.e., the spot beam signal and the earth-coverage beam signal) combined in the manner described above, while other antenna elements (outer elements) transmit only one signal (i.e., the spot beam signal).

Although capable of transmitting a different signal with each respective beam, the techniques of the present invention can be used to send the same signals on more than one beam. For example, a scenario could exist in which an earth-coverage beam carries a first signal, while two separate spot beams oriented in different directions both carry the same second signal. In general, any combination of signals and beams can be generated by applying appropriate phase shifts to the individual antenna elements.

Having described preferred embodiments of new and improved methods and apparatus for multi-beam, multi-signal transmission for active phased array antenna, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of transmitting a plurality of signals from a common antenna, comprising:
    (a) generating a first signal for transmission via a first transmit beam;
    (b) generating a second signal for transmission via a second transmit beam;
    (c) forming a composite signal that includes the first and second signals, wherein the phase of the composite signal accounts for signal modulation and beam forming characteristics of the first and second signals, and wherein the composite signal has a constant amplitude envelope;
    (d) supplying the composite signal to the common antenna; and
    (e) transmitting the composite signal from the common antenna, thereby transmitting the first signal via the first transmit beam and transmitting the second signal via the second transmit beam.

2. The method of claim 1, wherein the first signal is different from the second signal.

3. The method of claim 1, wherein the first and second signals are transmitted at a common frequency.

4. The method of claim 1, wherein the first transmit beam is a Global Positioning System (GPS) earth coverage beam and the second transmit beam is a steerable GPS spot beam.

5. The method of claim 1, wherein the common antenna is a phased array antenna comprising an array of antenna elements, and wherein:
    (c) includes forming a plurality of composite signals, wherein phases of the composite signals are a function of phases of respective antenna elements required to form the first and second transmit beams; and
    (d) includes supplying the plurality of composite signals to the respective antenna elements of the phased array antenna.

6. The method of claim 5, wherein at least one of the first and second transmit beams is electronically steerable by adjusting phases of the composite signals.

7. A method of transmitting a plurality of signals from a common phased array antenna comprising an array of antenna elements, the method comprising:
    (a) generating a plurality of first modulated signals corresponding to antenna elements for transmission via a first transmit beam, and phase shifting the first modulated signals in accordance with phases of the antenna elements required to form the first transmit beam;
    (b) generating, separate from the plurality of first modulated signals, a plurality of second modulated signals corresponding to antenna elements for transmission via a second transmit beam, and phase shifting the second modulated signals in accordance with phases of the antenna elements required to form the second transmit beam;
    (c) forming a Plurality of composite signals by combining phase shifted first modulated signals with respective phase shifted second modulated signals, wherein phases of the composite signals are a function of signal modulations of the first and second modulated signals and phases of the respective antenna elements required to form the first and second transmit beams;

(d) supplying the plurality of composite signals to the respective antenna elements of the phased array antenna; and (e) transmitting the composite signal from the common antenna, thereby transmitting the first modulated signal via the first transmit beam and transmitting the second modulated signal via the second transmit beam.

8. The method of claim 7, wherein (a) includes attenuating the phase shifted first modulated signals and (b) includes attenuating the phase shifted second modulated signals to control a distribution of power between the first and second transmit beams.

9. The method of claim 5, wherein (c) includes:

forming a plurality of digital composite signals corresponding to the respective antenna elements, wherein phases of the digital composite signals are a function of modulation of the first and second signals and phases of the respective antenna elements required to form the first and second transmit beams;

converting the digital composite signals to analog composite signals;

modulating carrier signals with the analog composite signals to form the plurality of composite signals.

10. The method of claim 9, wherein:

(a) includes determining, phases of a plurality of first digital signals corresponding to the respective antenna elements, based on a modulation of the first signal and phases of the respective antenna elements required to form the first transmit beam;

(b) includes determining phases of a plurality of second digital signals corresponding to the respective antenna elements, based on a modulation of the second signal and phases of the respective antenna elements required to form the second transmit beam; and (c) includes forming the plurality of digital composite signals based on the phases and amplitudes of the plurality of first and second digital signals.

11. The method of claim 10, wherein the digital composite signals are computed as a sum of the first and second digital signals.

12. The method of claim 10, wherein the digital composite signals are formed by interleaving the first and second digital signals.

13. The method of claim 9, further comprising:

(f) amplifying the plurality of composite signals using respective saturated high power amplifiers.

14. An apparatus for transmitting a plurality of signals, comprising:

a phased array antenna comprising an array of antenna elements; and a transmitter system that receives a first signal for transmission via a first transmit beam and a second signal for transmission via a second transmit beam, the transmitter system forming a plurality of composite signals and supplying the plurality of composite signals to respective antenna elements of the phased array antenna, wherein phases of the composite signals are a function of signal modulations of the first and second signals and phases of the respective antenna elements required to form the first and second transmit beams, and wherein each of the composite signals has a constant amplitude envelope;

wherein the phased array antenna transmits the first signal via the first transmit beam and transmits the second signal via the second transmit beam.

15. The apparatus of claim 14, wherein the first signal is different from the second signal.

16. The apparatus of claim 14, wherein the phased array antenna transmits the first and second signals at a common frequency.

17. The apparatus of claim 14, wherein at least one of the first and second transmit beams is electronically steerable by adjusting phases of the composite signals.

18. The apparatus of claim 14, wherein: the apparatus is a Global Positioning System (GPS) satellite, and wherein the first transmit beam is a GPS earth coverage beam and the second transmit beam is a steerable GPS spot beam.

19. An apparatus for transmitting a plurality of signals, comprising:

a phased array antenna comprising an array of antenna elements; and a transmitter system that receives a first signal for transmission via a first transmit beam and a second signal for transmission via a second transmit beam, the transmitter system forming a plurality of composite signals and supplying the plurality of composite signals to respective antenna elements of the phased array antenna, wherein phases of the composite signals are a function of signal modulations of the first and second signals and phases of the respective antenna elements required to form the first and second transmit beams;

wherein the phased array antenna transmits the first signal via the first transmit beam and transmits the second signal via the second transmit beam; and wherein the transmitter system further comprises:

a first power splitter that produces a plurality of first modulated signals from the first signal;

a first array of phase shifters that phase shift the first modulated signals in accordance with phases of the respective antenna elements required to form the first transmit beam;

a second power splitter that produces a plurality of second modulated signals from the second signal;

a second array of phase shifters that phase shift the second modulated signals in accordance with phases of the respective antenna elements required to form the second transmit beam; and a combiner that combines the phase shifted first modulated signals with respective phase shifted second modulated signals to form the plurality of composite signals.

20. The apparatus of claim 19, further comprising a first array of attenuators that attenuate the first modulated signals and a second array of attenuators that attenuate the second modulated signals to control a distribution of power between the first and second transmit beams.

21. The apparatus of claim 19, further comprising an array of linear amplifiers that respectively amplify the plurality of composite signals.

22. The apparatus of claim 14, wherein the transmitter system further comprises:

a processor that forms a plurality of digital composite signals corresponding to the respective antenna elements, wherein phases of the digital composite signals are a function of modulation of the first and second signals and phases of the respective antenna elements required to form the first and second transmit beams;

an array of digital-to-analog converters that convert the digital composite signals to analog composite signals; and an array of signal modulators that modulate carrier signals with the analog composite signals to form the plurality of composite signals.

23. The apparatus of claim 22, wherein the processor:

determines phases of a plurality of first digital signals corresponding to the respective antenna elements based on a modulation of the first signal and phases of the respective antenna elements required to form the first transmit beam;

determines phases of a plurality of second digital signals corresponding to the respective antenna elements based on a modulation of the second signal and phases of the respective antenna elements required to form the second transmit beam; and forms the plurality of digital composite signals based on the phases and amplitudes of the plurality of first and second digital signals.

24. The apparatus of claim 23, wherein the processor computes the digital composite signals as a sum of the first and second digital signals.

25. The apparatus of claim 23, wherein the processor forms the digital composite signals by interleaving the first and second digital signals.

26. The apparatus of claim 22, further comprising:

an array of saturated high power amplifiers that respectively amplify the plurality of composite signals.

27. An apparatus for transmitting a plurality of signals, comprising:

a phased array antenna comprising an array of antenna elements; and means for forming a plurality of composite signals from a first signal and a second signal, and for supplying the plurality of composite signals to respective antenna elements of the phased array antenna for transmission, wherein phases of the composite signals are a function of signal modulations of the first and second signals and phases of the respective antenna elements required to transmit the first signal via a first transmit beam and to transmit the second signal via a second transmit beam, and wherein each of the composite signals has a constant amplitude envelope.

28. A method of transmitting a plurality of signals from a common antenna, comprising:

(a) generating a first signal for transmission via a first transmit beam;

(b) generating a second signal for transmission via a second transmit beam;

(c) forming a composite signal by time interleaving the first signal and the second signal, wherein the phase of the composite signal accounts for signal modulation and beam forming characteristics of the first signal and, alternately, the signal modulation and beam forming characteristics of the second signal;

(d) supplying the composite signal to the common antenna; and (e) transmitting the composite signal from the common antenna, thereby transmitting the first signal via the first transmit beam and transmitting the second signal via the second transmit beam.

29. The method of claim 28, wherein the common antenna is a phased array antenna comprising an array of antenna elements, and wherein:

(c) includes forming a plurality of composite signals, wherein phases of the composite signals are a function of phases of respective antenna elements required to form the first and second transmit beams; and (d) includes supplying the plurality of composite signals to the respective antenna elements of the phased array antenna.

30. The method of claim 29, wherein (c) includes:

forming a plurality of digital composite signals corresponding to the respective antenna elements, wherein phases of the digital composite signals are a function of modulation of the first and second signals and phases of the respective antenna elements required to form the first and second transmit beams;

converting the digital composite signals to analog composite signals;

modulating carrier signals with the analog composite signals to form the plurality of composite signals.

31. The method of claim 30, wherein:

(a) includes determining phases of a plurality of first digital signals corresponding to the respective antenna elements, based on a modulation of the first signal and phases of the respective antenna elements required to form the first transmit beam;

(b) includes determining phases of a plurality of second digital signals corresponding to the respective antenna elements, based on a modulation of the second signal and phases of the respective antenna elements required to form the second transmit beam; and (c) includes forming the plurality of digital composite signals based on the phases and amplitudes of the plurality of first and second digital signals.

32. An apparatus for transmitting a plurality of signals, comprising:

a phased array antenna comprising an array of antenna elements; and a transmitter system that receives a first signal for transmission via a first transmit beam and a second signal for transmission via a second transmit beam, the transmitter system forming a plurality of composite signals by time interleaving the first signal and the second signal, and supplying the plurality of composite signals to respective antenna elements of the phased array antenna, wherein phases of the composite signals are a function of a signal modulation of the first signal and phases of the respective antenna elements required to form the first transmit beam and, alternately, a function of a signal modulation of the second signal and phases of the respective antenna elements required to form the second transmit beam;

wherein the phased array antenna transmits the first signal via the first transmit beam and transmits the second signal via the second transmit beam.

* * * * *